(12) United States Patent
Svensson et al.

(10) Patent No.: US 11,649,761 B1
(45) Date of Patent: May 16, 2023

(54) SYSTEMS FOR METHANOL VAPORIZATION

(71) Applicant: Caterpillar Inc., Peoria, IL (US)

(72) Inventors: Kenth I. Svensson, Peoria, IL (US); Jonathan W. Anders, Peoria, IL (US); Naga Krishna Chaitanya Kavuri, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/559,288

(22) Filed: Dec. 22, 2021

(51) Int. Cl.
 *F02B 47/04* (2006.01)
 *F02M 1/00* (2006.01)

(52) U.S. Cl.
 CPC ............. *F02B 47/04* (2013.01); *F02M 1/005* (2013.01)

(58) Field of Classification Search
 CPC ................................. F02B 47/04; F02M 1/005
 See application file for complete search history.

(56) References Cited

U.S. PATENT DOCUMENTS

| | | | | |
|---|---|---|---|---|
| 4,519,342 A | * | 5/1985 | Yoon | B01J 8/02 |
| | | | | 123/3 |
| 4,567,857 A | * | 2/1986 | Houseman | F02B 51/02 |
| | | | | 123/3 |
| 10,023,818 B2 | | 7/2018 | Morris et al. | |
| 2004/0244375 A1 | * | 12/2004 | Kono | F02D 41/0005 |
| | | | | 60/601 |
| 2006/0021867 A1 | | 2/2006 | Zhang | |

FOREIGN PATENT DOCUMENTS

| | | |
|---|---|---|
| CN | 105134351 A | 12/2015 |
| CN | 110816800 A | 2/2020 |
| CN | 210219988 U | 3/2020 |
| CN | 213743762 U | 7/2021 |
| WO | WO2014126090 A1 | 8/2014 |

* cited by examiner

*Primary Examiner* — Loren C Edwards
*Assistant Examiner* — Edward Bushard
(74) *Attorney, Agent, or Firm* — Lee & Hayes, P.C.

(57) ABSTRACT

An exhaust heater system includes an exhaust heater and an air supply tube disposed within the exhaust heater. Relatively hot exhaust gas from an engine is directed into the exhaust heater, whereby heat from the exhaust heats the interior of the air supply tube. The heat partially vaporizes liquid methanol injected into the air supply tube. To control the amount of heating, the exhaust can be directed to the air supply tube as well as an exhaust bypass, whereby exhaust directed to the exhaust bypass does not heat the interior of the air supply tube.

20 Claims, 10 Drawing Sheets

SYSTEMS FOR METHANOL VAPORIZATION

TECHNICAL FIELD

The present disclosure relates generally to operating an internal combustion engine, and more particularly, to injecting methanol into a heated intake air stream to vaporize at least a portion of the methanol, whereby the air stream is heated using exhaust heat of the internal combustion engine.

BACKGROUND

The internal combustion engine is widely used in various industries. Internal combustion engines can operate on a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. Further, in pilot-ignited applications, including dual fuel applications, a mixture of a gaseous fuel, such as natural gas and air, is delivered into a cylinder and ignition is triggered using a relatively small direct injection of a compression ignition fuel which autoignites to trigger ignition of the relatively larger main charge.

As part of the effort to improve the efficiency of these engines, researchers have explored various types of alternate fuel mixtures, including alcohol fuels like methanol. In some examples, methanol is directly injected into an engine cylinder and the methanol is ignited with a pilot fuel or a spark. The use of methanol can provide various benefits over other alternate fuel additives. For example, methanol has relatively low production costs and can be less expensive to produce relative to other alternative fuels. Further, the availability of methanol can be greater than other sources of alternate fuel additives because methanol can be produced in a variety of ways using materials ranging from natural gas to coal. Further, methanol is relatively safe to use, store, and transport because methanol has a relatively low risk of flammability.

However, methanol is characterized by a relatively high latent heat of vaporization which can be problematic in some situations. For example, when injecting methanol into an intake system, the relatively high latent heat of vaporization can result in a portion of the methanol forming as a film on the interior walls of the intake system. Liquid methanol that enters a combustion chamber affects the performance of the engine. For example, liquid methanol can cause random perturbations (or deviations) in the conditions of a combustion cylinder, increasing cycle-to-cycle variations and decreasing combustion stability. Further liquid methanol can corrosively attack the interior surfaces of the cylinders, pistons, and other components involved in the combustion cycle inside the engine.

Some efforts have been made to ameliorate this issue. For example, Chinese Patent Application No. CN110816800A to Long Wuqiang et al. ("the '800 application") describes a system configured to raise the temperature of methanol stored in a storage tank. The system of the '800 application includes a methanol reformer and a vaporizer. The vaporizer superheats the methanol prior to entering the methanol reformer. However, the system described in the '800 application is not directed to internal combustion engines that use methanol as a component of fuel. As a result, the system set forth in the '800 does not solve issues relating to the above-noted issues relating to the use of methanol as a fuel.

Examples of the present disclosure are directed to overcoming deficiencies of such systems.

SUMMARY

In an aspect of the present disclosure, a method of operating an engine includes receiving air into a heating section of an intake manifold, injecting methanol into the heating section to form a methanol/air mixture, vaporizing at least a portion of the methanol in the methanol/air mixture by directing exhaust into an exhaust heater, wherein the heating section is at least partially internally disposed within the exhaust heater allowing for heat from the exhaust to heat the heating section, introducing a fuel and the methanol/air mixture into a combustion cylinder, and causing the fuel and the methanol/air mixture in the combustion cylinder to ignite.

In another aspect of the present disclosure, an exhaust heater system includes an exhaust tube having an exhaust tube outer surface, an exhaust tube inner surface, and a longitudinal central axis extending substantially centrally through the exhaust tube, the exhaust tube inner surface defining an interior space of the exhaust tube, an air supply tube disposed within the interior space of the exhaust tube, the air supply tube having an air supply tube outer surface and an air supply tube inner surface, a methanol injector configured to inject methanol into the air supply tube, a turbine configured to receive exhaust from an engine and direct the exhaust to the exhaust tube, and a compressor powered by turbine, the compressor configured to direct compressed air into the air supply tube, wherein heat from the exhaust in the exhaust tube heats and vaporizes at least a portion of the methanol injected into the air supply tube In a still further aspect of the present disclosure, an internal combustion engine fuel system includes an exhaust heater system comprising an exhaust tube having an exhaust tube outer surface, an exhaust tube inner surface, and a longitudinal central axis extending substantially centrally through the exhaust tube, the exhaust tube inner surface defining an interior space of the exhaust tube, an air supply tube disposed within the interior space of the exhaust tube, the air supply tube having an air supply tube outer surface and an air supply tube inner surface, a methanol injector configured to inject methanol into the air supply tube, a turbine configured to receive exhaust from an engine and direct the exhaust to the exhaust tube, and a compressor powered by turbine, the compressor configured to direct compressed air into the air supply tube to form a methanol/air mixture in the air supply tube, wherein heat from the exhaust in the exhaust tube heats and vaporizes at least a portion of the methanol injected into the air supply tube. The internal combustion engine fuel system further includes a fuel injector for injecting a fuel into the methanol/air mixture.

DETAILED DESCRIPTION

Figure 1:
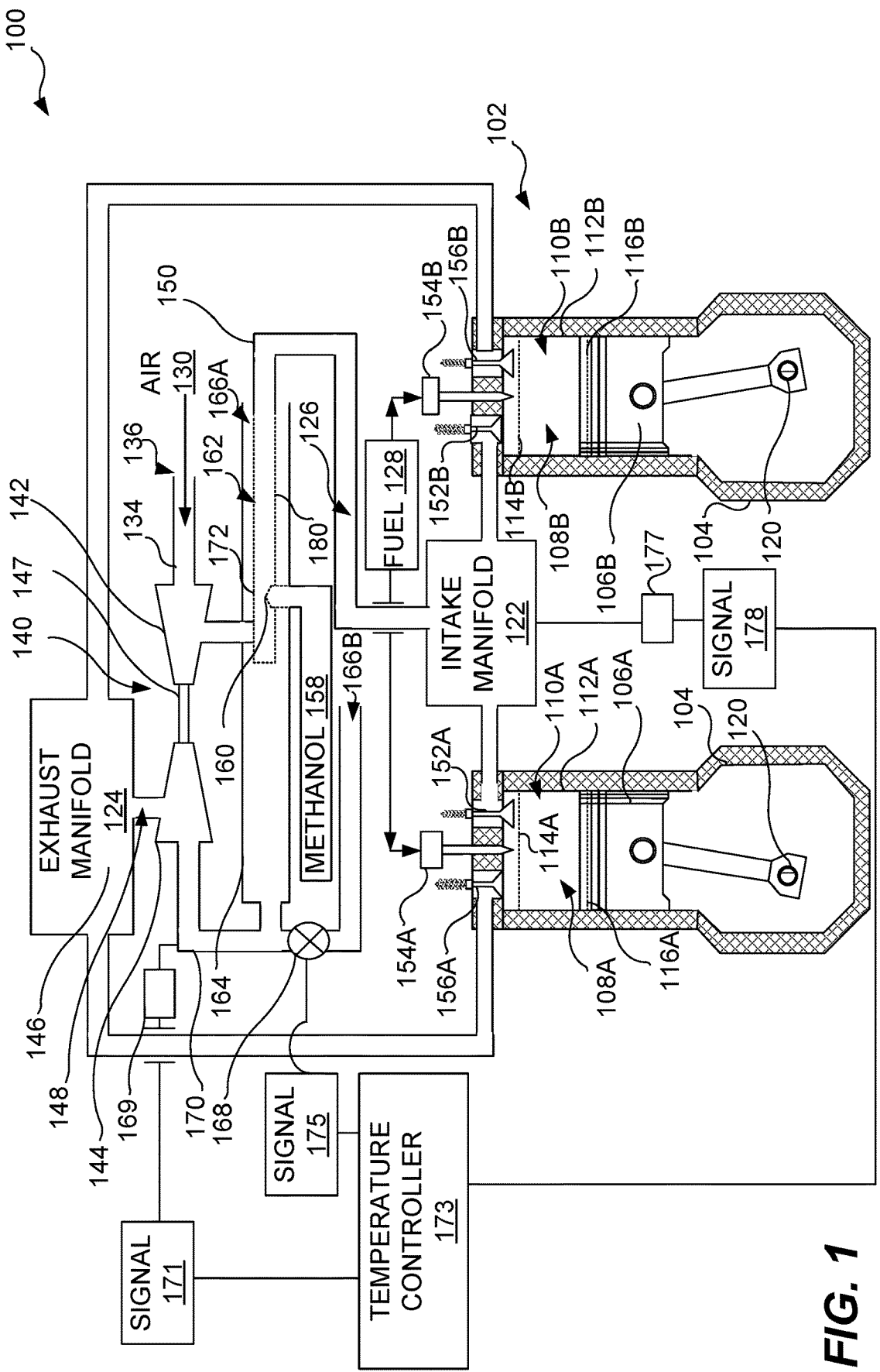
FIG. 1 is a schematic illustration of a system, including an internal combustion engine that uses a portion of heat from the exhaust of the engine to at least partially vaporize methanol prior to injection into the engine, in accordance with one or more examples of the present disclosure

Wherever possible, the same reference numbers will be used throughout the drawings to refer to same or like parts. Referring to FIG. 1, there is shown an internal combustion engine system 100, in accordance with an example of the present disclosure. In the example shown in FIG. 1, the internal combustion engine system 100 includes an internal combustion engine 102 having an engine housing 104. The internal combustion engine 102 further includes a first piston 106A and a second piston 106B. The first piston 106A is disposed within an interior volume 108A of a first combustion cylinder 110A. The interior volume 108A is defined by an inner surface 112A of the first combustion cylinder 110A. The second piston 106B is disposed within an interior volume 108B of a second combustion cylinder 110B. The interior volume 108B is defined by an inner surface 112B of the second combustion cylinder 110B. The first piston 106A is movable between a first top dead center position 114A and first bottom dead center position 116A. The second piston 106B is movable between a second top dead center position 114B and second bottom dead center position 116B. The first piston 106A and the second piston 106B move between the first top dead center position 114A and the first bottom dead center position 116A, and the second top dead center position 114B and the second bottom dead center position 116B, respectively, to rotate a crankshaft 120 in a generally conventional manner.

The internal combustion engine system 100 further includes an intake manifold 122 and an exhaust manifold 124. The intake manifold 122 supplies a methanol/air mixture 126 comprising methanol 158 and air 130. A compression ignition fuel 128, such as diesel fuel, is injected into the interior volume 108A of the first combustion cylinder 110A using direct injector 154A and the interior volume 108B of the second combustion cylinder 110B using direct injector 154B. The compression of the methanol/air mixture 126 and the fuel 128 causes the fuel 128 to autoignite and subsequently the methanol/air mixture 126 to ignite, forcing the first piston 106A from the first top dead center position 114A to the first bottom dead center position 116A position and the second piston 106B from the second top dead center position 114B to the second bottom dead center position 116B. It should be noted that the presently disclosed subject matter is not limited to any particular type of fuel. For example, if the internal combustion engine system 100 is a gasoline engine, the fuel 128 comprises one or more octanes of gasoline. It should be noted that the fuel 128 may additionally include fuel additives and the like.

The air 130 is introduced into a first air intake section 134 of the internal combustion engine system 100 at air intake 136. The air 130 is compressed by a turbo 140. The turbo 140 includes a compressor 142 and a turbine 144. The turbine 144 receives exhaust 146 from the exhaust manifold 124, through exhaust intake 148, and into the turbine 144. The exhaust 146 includes bi-products of the combustion process taking place within the internal combustion engine system 100 (explained in more detail, below), and thus, is at a relative high pressure and temperature as compared to the air 130. The pressure (and temperature) of the exhaust 146 impinges on the blades of the turbine 144, thereby causing the blades, and a shaft 147 of the turbo 140 connected thereto, to rotate in a conventional manner. The rotation of the shaft 147 of the turbo 140 in turn causes the blades internal to a compressor 142 to rotate. The rotation of the blades of the compressor 142 compresses the air 130 in the first air intake section 134 to a higher pressure in a second air intake section 150, providing for the use of an increased amount of the fuel 128 on a stoichiometric basis.

The methanol/air mixture 126 enters the first combustion cylinder 110A through the intake manifold 122 and first intake valve 152A. The mixture of the fuel 128 introduced through the direct injector 154A and the methanol/air mixture 126 is introduced through the first intake valve 152A. The autoignition of the fuel 128 ignites the methanol/air mixture 126 in the first combustion cylinder 110A to form the exhaust 146, which exits the first combustion cylinder 110A through a first exhaust valve 156A. In a similar manner, the methanol/air mixture 126 enters the second combustion cylinder 110B through the intake manifold 122 and second intake valve 152B. The autoignition of the fuel 128 ignites the methanol/air mixture 126 in the second combustion cylinder 110B to form the exhaust 146, which exits the second combustion cylinder 110B through a second exhaust valve 156B. It should be noted that the direct injector 154A and the direct injector 154B may not be used if the internal combustion engine system 100 uses gasoline or other fuel types, as those ignition systems can use spark plugs and the like. The presently disclosed subject matter is not limited to any particular combustion configuration.

Methanol 158 is injected into the second air intake section 150 at a methanol injection port 160 in a heating section 162 of the second air intake section 150. It should be noted that various examples of the presently disclosed subject matter can include more than one methanol injection port 160. The heating section 162 is the portion of the second air intake section 150 that is internally disposed within a tubular, hollow exhaust heater 164, physically and functionally described in more detail in FIGS. 2-4, below. In the internal combustion engine system 100, the exhaust 146 can exit the internal combustion engine system 100 thru exhaust port 166A and/or 166B using throttle valve 168. As the throttle valve 168 is opened, an increasing portion of the exhaust 146 exiting the turbine 144 into exhaust exit section 170 exits the exhaust port 166B, while some of the exhaust 146 exits the exhaust port 166A. If the throttle valve 168 is closed, the exhaust 146 exiting the turbine 144 into the exhaust exit section 170 exits the exhaust port 166A. The throttle valve 168 may be opened and closed for various reasons. For example, a thermocouple 169 may be affixed to the exhaust exit section 170. The thermocouple 169 may be used to detect a temperature in the exhaust exit section 170. In another example, a thermocouple 177 is affixed to the intake manifold 122 to detect the temperature of the intake manifold 122. It should be noted that more or fewer thermocouples may be used, as well as thermocouples in other locations. A temperature controller 173 receives a signal 171 from the thermocouple 169 and/or the signal 178 from the thermocouple 177 and determines if the signal 171 or the signal 178 represents a temperature above a setpoint. If the temperature is above a setpoint, the temperature controller outputs a signal 175 to open the throttle valve 168, reducing the amount of heating of fluids entering the intake manifold 122, reducing the temperature of the exhaust exit section 170 and/or the intake manifold 122. In some examples, the signal 175 is a proportional signal, meaning that the signal is not an open fully or close fully signal, but rather, a signal that instructs the throttle valve to open more or close more. This proportional signal can be used by the temperature controller 173 using a map, whereby at certain temperatures of the first combustion cylinder 110A, the throttle valve 168 is to be set to a specific opening value. Therefore, instead of, or in addition to, the use of the setpoints, the temperature controller 173 can use proportional signals to control the temperature of the first combustion cylinder 110A. The temperature controller 173 may be used to control temperatures of other components, the use of which is considered to be within the scope of the presently disclosed subject matter.

As noted above, the methanol 158 has a relatively high latent heat of vaporization of methanol, including when compared to the fuel 128. Thus, the portions of the methanol 158, when injected into the second air intake section 150 through the methanol injection port 160, can remain liquid. In some examples, most, if not all, of the methanol 158 injected through the methanol injection port 160 is vapor by the time the methanol 158 reaches the intake manifold 122, or at least the first intake valve 152A and/or the second intake valve 152B. The heating section 162 is used to increase the temperature of the air 130 and the methanol 158 moving through the heating section 162. The exhaust 146 moves through the hollow exhaust heater 164 and around an exterior wall 172 of the heating section 162. As the exhaust 146 moving through the hollow exhaust heater 164 is at a relatively higher temperature than the air 130 moving the heating section 162, a portion of the heat from the exhaust 146 is transferred into the heating section 162 through a heat transfer process. At least a portion of the heat transferred into the heating section 162 is transferred into the air 130 moving thru the heating section 162.

Moving through the heating section 162, the methanol 158 can be heated in various physical processes such as radiation, convention, and conduction. A first process can be a heat exchange between the methanol 158 and the air 130. As noted above, heat transfer from thermal energy transferred through the exterior wall 172 of the heating section 162 heats the air 130 that is traveling through the heating section 162. The heated air 130 in turn heats the methanol 158. In another example, the methanol 158 itself is heated by the thermal energy transferred through the exterior wall 172 of the heating section 162 from heat transfer. In a still further example, the methanol 158 can impact or impinge upon an inner surface 180 of the heating section 162. The inner surface 180 receives heat from the exterior wall 172. Upon the methanol 158 impinging upon the inner surface 180 of the heating section 162, heat is transferred into the methanol 158 at the location of contact. In a still further example, methanol 158 that is in liquid form may be heated by higher temperature methanol 158, including methanol 158 in vapor form. These and other forms of heating the methanol 158 into a vapor form may be used and are considered to be within the scope of the presently disclosed subject matter.

The input of heat (thermal energy) into the liquid methanol 158 from the air 130 and/or the inner surface 180 of the heating section 162 in the various heating forms described above can increase the amount of the methanol 158 that is in vapor form as opposed to the methanol in liquid form prior to entering into the first combustion cylinder 110A and/or the second combustion cylinder 110B. As noted above, this heating process occurs in the heating section 162, an example of which is described in more detail in FIG. 2, below.

Figure 2:
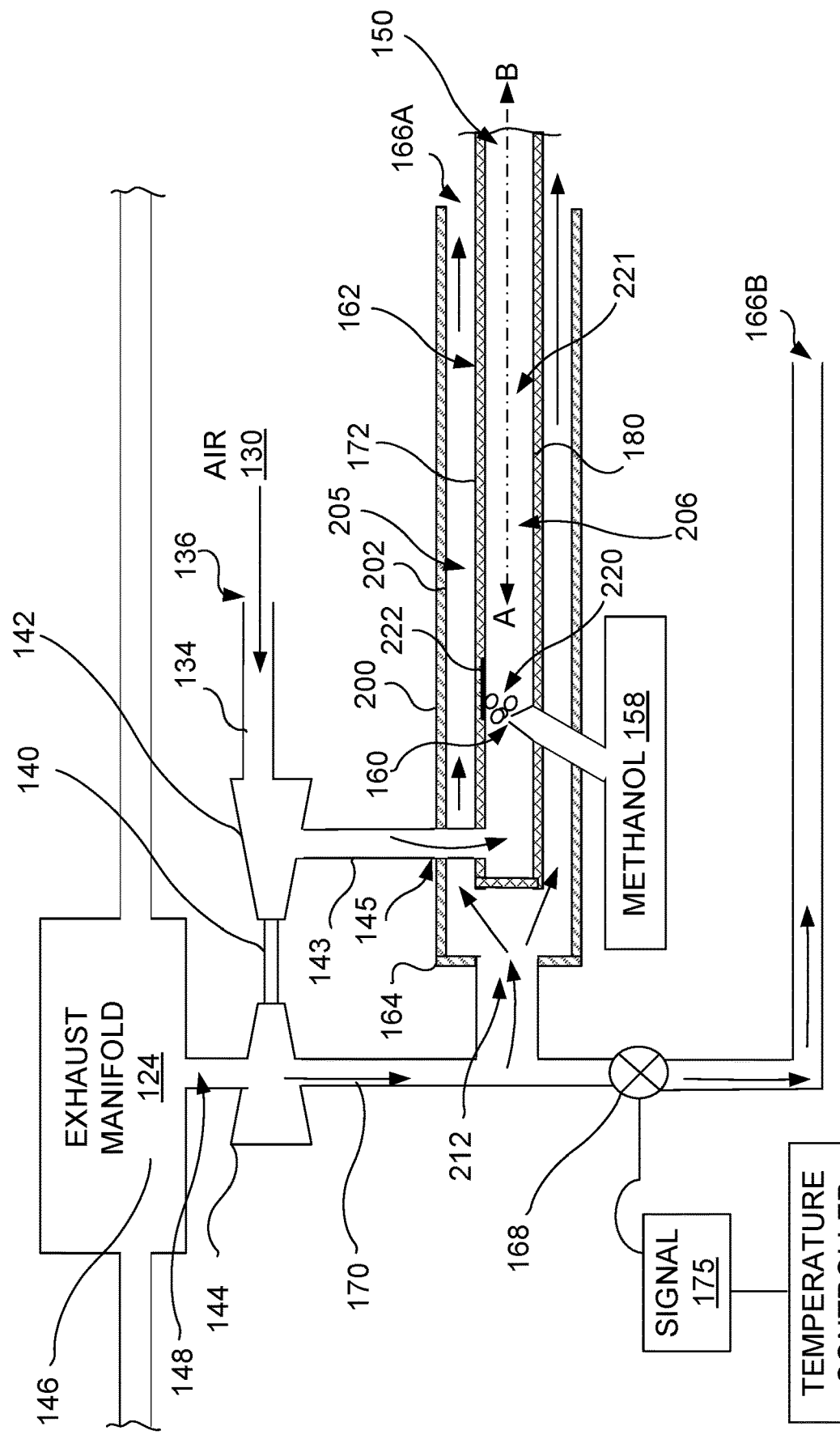
FIG. 2 is a cross-sectional view of the heating section of the engine of FIG. 1, in accordance with one or more examples of the present disclosure.

FIG. 2 is a cross-sectional view of the heating section 162 of system 100 of FIG. 1, along with other components that input or receive fluid from the heating section 162. Some parts of the internal combustion engine 102 have been omitted from FIG. 2 for ease of illustration and not by way of limitation. Shown in FIG. 2 is the exhaust manifold 124 that receives the exhaust 146 from the internal combustion engine 102 (shown in FIG. 1, above). The exhaust 146 enters the turbine 144 and is exhausted through the exhaust exit section 170. The throttle valve 168, controlled by the signal 175 from the temperature controller 173, controls the volumetric flowrate of the exhaust 146 that enters the hollow exhaust heater 164 and exits through the exhaust port 166A as opposed to the exhaust port 166B. The rotational motion provided by the turbine 144 causes the compressor 142 of the turbo 140 to compress the air 130 into compressed air tube 143 prior to entering the heating section 162. The compressed air tube 143 is fitted through the hollow exhaust heater 164 at hermetically sealed junction 145 and into the heating section 162. The hermetically sealed junction 145 allows the air 130 in the compressed air tube 143 to travel through the hollow exhaust heater 164 and into the heating section 162 without the air 130 and the exhaust 146 mixing. The following description in which a heating section is internal to a hollow exhaust heater uses a hermetically sealed junction to allow air to move into the heating section without mixing with the exhaust, providing for a "tube within a tube" configuration. The compressed air 130 exits the heating section 162 into the second air intake section 150 and into the intake manifold 122, shown in FIG. 1.

The hollow exhaust heater 164 is a generally tubular shape having a heater outer wall 200 and a heater inner wall 202 extending axially along center axis AB. The heating section 162 is a generally tubular shape having the exterior wall 172 and the inner surface 180 extending axially along center axis AB. An outer heat exchange cavity 205 is defined between the heater inner wall 202 and the exterior wall 172. An interior heat exchange cavity 206 is defined as the hollow within the inner surface 180. In the outer heat exchange cavity 205, heat from the exhaust 146 entering at exhaust input port 212 transfers heat from the exhaust 146 to the exterior wall 172 primarily through convective heating as the exhaust 146 moves from the exhaust input port 212 to the exhaust port 166A. The thermal energy of the exhaust 146 transfers from the exterior wall 172 through to the inner surface 180 along the heating section 162.

In the interior heat exchange cavity 206, the methanol 158 in liquid form introduced through the methanol injection port 160 is illustrated as droplets 220. It is understood that some methanol 158 may enter the interior heat exchange cavity 206 already in vapor form. The presently disclosed subject matter is not limited to liquid methanol 158 injection. Once injected, the interior heat exchange cavity 206 has a methanol/air mixture 221. As mentioned above, there are several example forms of heat exchange in the interior heat exchange cavity 206 to vaporize the methanol 158 droplets 220. An example of heat exchange is convention/conduction when a droplet 220 impinges upon the inner surface 180, which is heated from the exhaust 146 moving past and around the exterior wall 172. An example impingement location 222 of the inner surface 180 is illustrated in FIG. 2. The impingement location 222 is a location of the inner surface 180 to which at least a portion of the droplets 220 travel as the droplets are introduced through the methanol injection port 160. Upon contact with the impingement location 222, the droplets 220 receive heat from the inner surface 180, whereby at least a portion of the droplets receive enough heat to vaporize into a gaseous form of methanol 158. It should be noted that the entire inner surface 180 is a potential impingement location 222. The illustration of a singular impingement location 222 is merely for purposes of explanation. Further, in some examples, the impingement location 222 is the same surface as the inner surface 180 and is merely one or more locations of the inner surface 180.

Another example form of heat exchange sufficient to vaporize the methanol 158 droplets 220 is radiant heat/convention from the inner surface 180. In some examples, the droplets 220 do not contact or impinge upon the inner surface 180. However, heat from the inner surface 180 can be radiant heat that inputs heat to the droplets. Further, the heat from the inner surface 180 can also transfer to the droplets using convective cooling. Thus, as the methanol 158 moves along the center axis AB from A to B, thermal energy from the inner surface 180 is added to the droplets 220 along the travel path of the droplets 220. A still further example form of heat exchange may be convective heating between the air 130 and the methanol 158 if the methanol 158 is at a lower temperature than the air 130 in the interior heat exchange cavity 206. In some examples, the compressor 142 adds heat to the air 130 when compressing the air 130.

The more heat and time available to vaporize the methanol 158 droplets 220, the probability of the droplets 220 being vaporized increases. Thus, the manner in which heat is introduced into an interior heat exchange cavity and the manner in which fluid flows may be modified. When looking at the flows in FIG. 2, the exhaust 146 and the air 130 traveling through the exhaust heater 164 travel along the central axis AB from location A to location B in a concurrent flow. FIGS. 3-9 illustrate other configurations for heat transfer.

Figure 3:
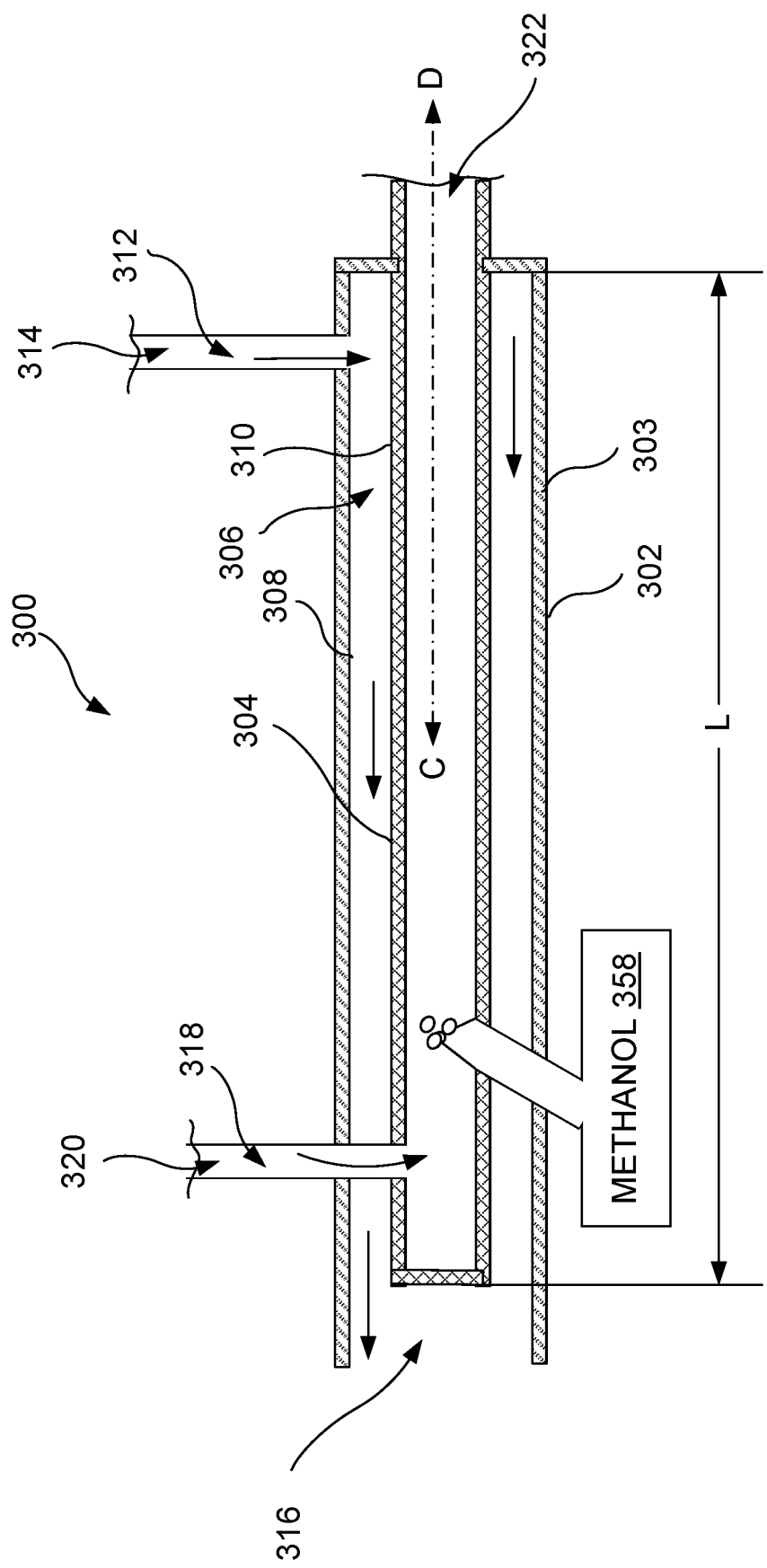
FIG. 3 is a cross-sectional view of an exhaust heater showing a counterflow design, in accordance with various examples of the presently disclosed subject matter.

FIG. 3 is a cross-sectional view of an exhaust heater 300 showing a counterflow design, in accordance with various examples of the presently disclosed subject matter. In a counterflow design, fluids traveling in opposing directions exchange thermal energy with each other. The exhaust heater 300 includes an exhaust tube 302 and an air supply tube 304. The exhaust tube 302 is tubular in shape, extending longitudinally along central axis CD and is defined by an outer surface 303 and an inner surface 308. An exhaust tube interior void 306 is defined by the inner surface 308 of the exhaust tube 302 and an outer surface 310 of the air supply tube 304. The air supply tube 304 is disposed within the exhaust tube 302 along length L longitudinally along a central axis CD. Exhaust 312, such as exhaust received from a turbine (not shown) or simply the exhaust received from an engine without a turbo, enters the exhaust tube 302 through exhaust input 314 and travels generally longitudinally along the central axis CD around the air supply tube 304 in the direction from D to C and exits through exhaust exit 316. Air 318 enters the air supply tube 304 through air input 320 and travels generally longitudinally along the central axis CD in the air supply tube 304 in the direction from C to D and exits through air exit 322. Thus, the directions of the air 318 and the exhaust 312 are counter to each other (i.e. different directions).

Along with extracting heat as desired from the exhaust 312, heat can also be maintained or added to the system to assist with heating methanol 358 injected into the air supply tube 304. The technologies for adding or maintaining heat within an air supply tube can be used individually or as series of steps in a protocol. Examples of these technologies are illustrated in FIG. 4, below.

Figure 4:
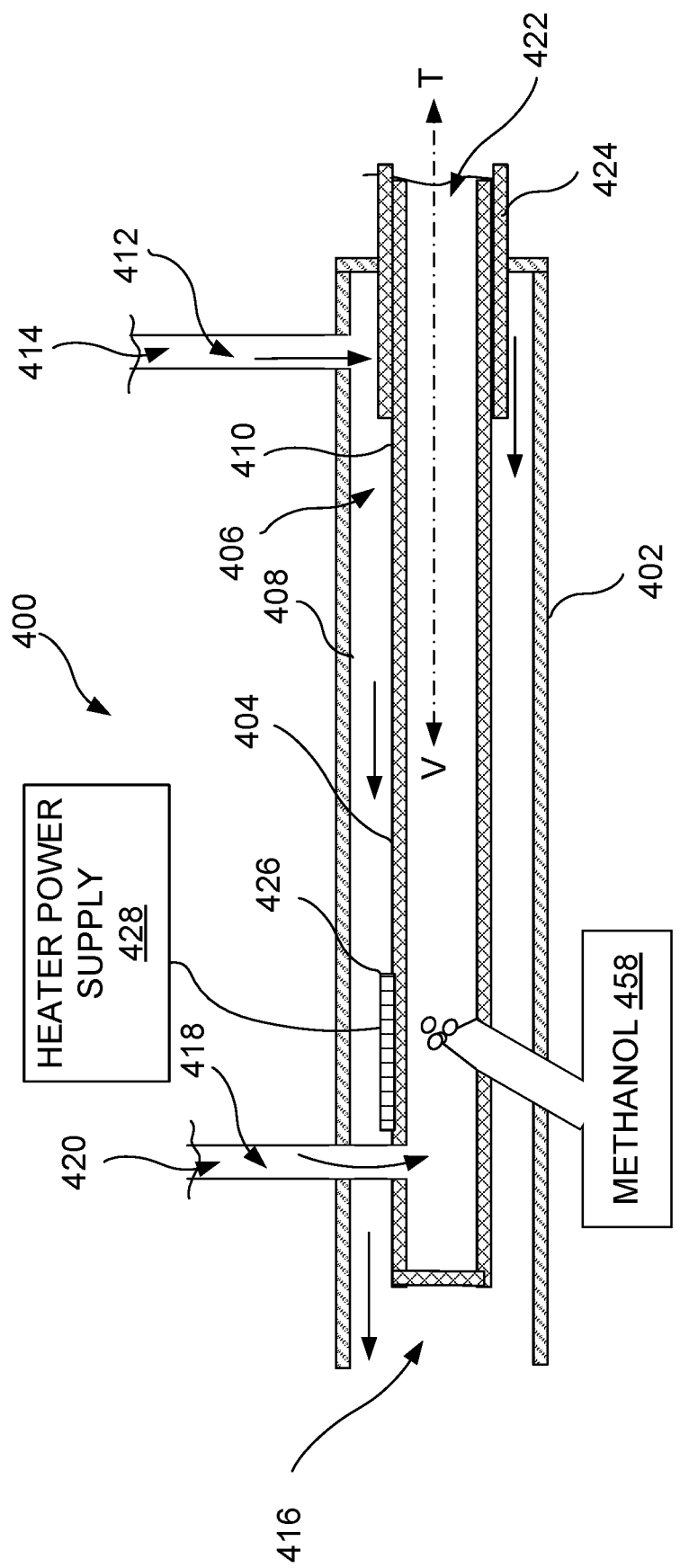
FIG. 4 is a cross-sectional view of an exhaust heater illustrating heat retention and addition technologies, in accordance with various examples of the presently disclosed subject matter.

FIG. 4 is a cross-sectional view of an exhaust heater 400 illustrating heat retention and addition technologies, in accordance with various examples of the presently disclosed subject matter. It should be noted that although the exhaust heater 400 is shown in a counterflow configuration, the technologies described herein are applicable to various types of flow designs, including, concurrent flow whereby fluids exchanging thermal energy travel in the same direction and crossflow whereby fluids exchanging thermal energy travel normal or perpendicular to each other. In FIG. 4, the exhaust heater 400 includes an exhaust tube 402 and an air supply tube 404. An exhaust tube interior void 406 is defined by an inner surface 408 of the exhaust tube 402 and an outer surface 410 of the air supply tube 404. The air supply tube 404 is disposed within the exhaust tube 402 in a manner similar to the exhaust heater 300 of FIG. 3. Exhaust 412, such as exhaust from a turbine (not shown) or simply the exhaust from an engine without a turbo, enters the exhaust tube 402 through exhaust input 414 and travels generally longitudinally along the central axis VT around the air supply tube 404 in the direction from location T to location V and exits through exhaust exit 416. Air 418 enters the air supply tube 404 through air input 420 and travels generally longitudinally along the central axis VT in the air supply tube 404 in the direction from V to T and exits through air exit 422.

As noted above, there may be various technologies for maintaining heat or adding heat into the air supply tube 404. In one example, an insulation 424 may be disposed on at least a portion of the outer surface 410 of the air supply tube 404. The insulation 424 includes, but is not limited to, mineral glass fiber, mineral wool, rock wool, glass wool, and polyurethane. The presently disclosed subject matter is not limited to any particular type of the insulation 424. In some examples, the insulation 424 is used to maintain heat within the air supply tube 404 by reducing the rate of heat transfer from the air supply tube 404 to an exterior of the air supply tube 404, thus increasing the amount of heat added to methanol 458 injected into the air supply tube 404. Another type of insulation 424, which may be in addition to or in place of other types, is a double walled construction of the air supply tube 404. In a double walled construction, the air supply tube 404 has two walls, sometimes separated by an insulative material such as air, foam, or an insulative construction such as the use of a partial vacuum. The presently disclosed subject matter is not limited to any particular double (or more)—walled technology.

In some examples, heat may be added to the air supply tube 404 using a heater 426. The heater 426 is disposed on the outer surface 410 of the air supply tube 404 and is powered by a heater power supply 428. The heater power supply 428 can be an electrical power supply, whereby current flowing into the heater 426 increases the temperature of the heater 426, thus adding heat to the outer surface 410 and eventually into the air supply tube 404. It should be noted that other forms of heating may be used and are considered to be within the currently disclosed subject matter. Returning to FIG. 4, the heater 426 can be used to supplement or replace heat provided by the exhaust 412. For example, during a startup of a combustion engine, the temperature and/or flow of the exhaust 412 may not be enough to appreciably add enough heat to the outer surface 410. Until the exhaust 412 temperature is high enough or has been flowing long enough, the outer surface 410 may be of a temperature insufficient to add enough heat into the air supply tube 404 to vaporize the methanol 458. In this example, the heater 426 is used to provide heat until the exhaust 412 is sufficient to add heat.

It should be noted that the heater 426 can be used in various configurations. For example, although illustrated as affixed to the outer surface 410, the heater 426 can also be used in other locations, such as in the air supply tube 404 and the like. Further, the heater 426 size and number may vary. The presently disclosed subject matter is not limited to any particular configuration. As noted above, the various forms of either maintaining heat or adding heat to vaporize methanol can be used in various situations such as a startup procedure, illustrated in more detail in FIG. 5.

Figure 5:
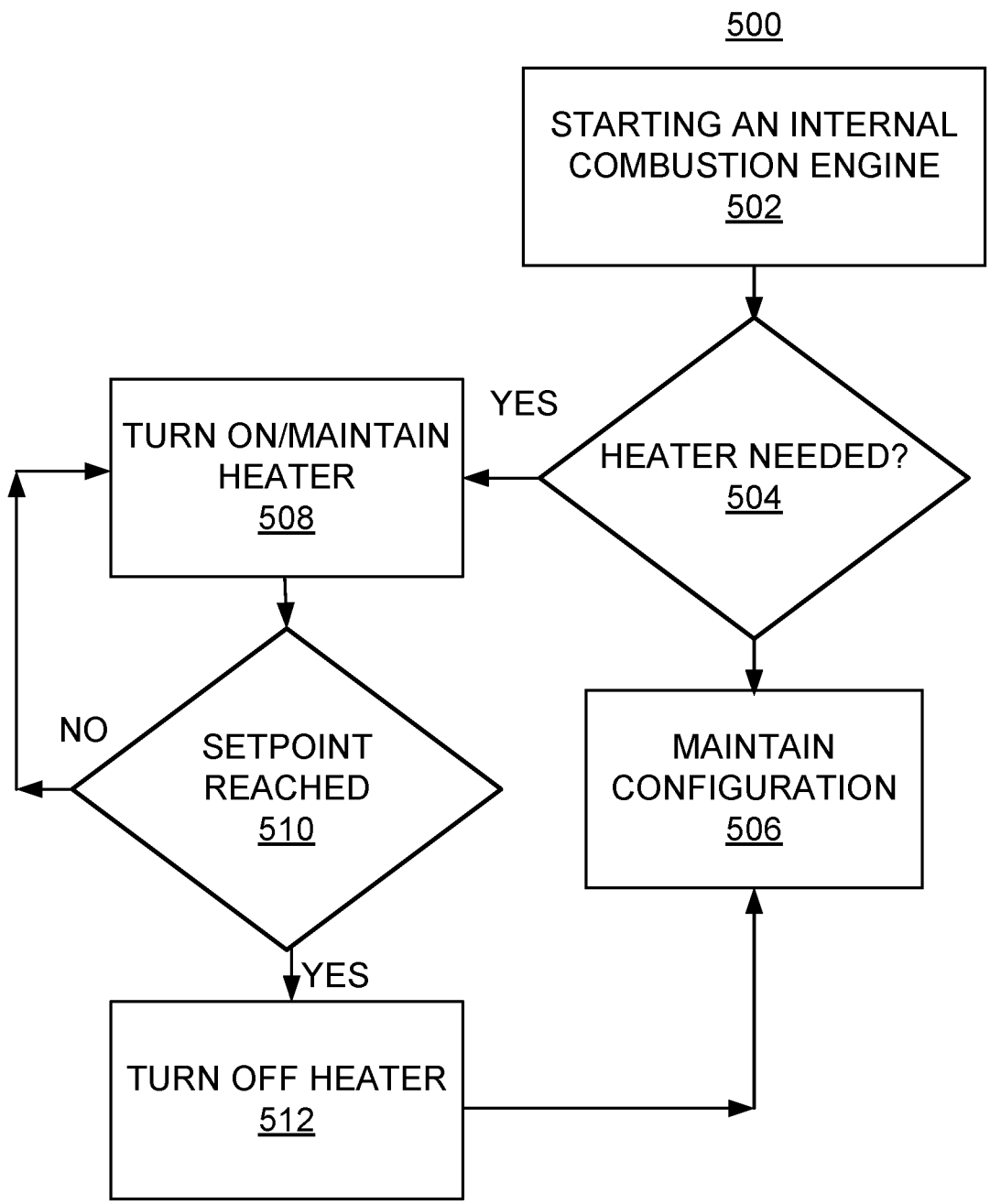
FIG. 5 illustrates a process for starting up a work machine that uses methanol as a component of a fuel supply, in accordance with one or more examples of the present disclosure.

FIG. 5 illustrates a process 500 for starting up a work machine that uses methanol as a component of a fuel supply, in accordance with one or more examples of the present disclosure. The process 500 and other processes described herein are illustrated as example flow graphs, each operation of which may represent a sequence of operations. The order in which the operations are described is not intended to be construed as a limitation, and any number of the described operations can be combined in any order and/or in parallel to implement the processes.

The process 500 includes operation 502 where the internal combustion engine 102 is started. During an example startup, such as an example startup in which the internal combustion engine 102 has not operated for an appreciable amount of time, the internal combustion engine 102 and its components may be at or near the temperature of the environment ("room temperature"). In this regard, the internal combustion engine 102 can use one or more forms of insulation, such as the insulation 424, which may be various forms of insulation or double walled construction of the air supply tube 404. This insulation 424 can help to maintain heat, including in the air supply tube 404, to vaporize at least a portion of the methanol 458.

At operation 504, the temperature controller 173 determines whether or not the heater 426 is needed or desired to increase the temperature of the air supply tube 404. During some operations, enough heat from the exhaust 412 is sufficient to increase the temperature of the air supply tube 404 to vaporize a desired percentage of liquid methanol. However, in one example, at operation 504, the temperature controller 173 determines that the air supply tube 404 temperature is not increasing at a desired or required rate to a specified setpoint temperature. For example, the temperature controller 173 can receive data that a percentage of liquid methanol injected has remained liquid. Therefore, the heater 426 can be an option at operation 504.

If the temperature controller 173 determines that the heater 426 is not needed (504-No), at operation 506, the temperature controller 173 maintains the current configuration, whereby the internal combustion engine 102 continues the startup process. If the heater is needed, at operation 508, the temperature controller 173 transmits a signal that activates the heater 426 or causes the heater 426 to turn on. As described above, the heater 426 can add heat to the air supply tube 404 until the heat from the exhaust is sufficient to take over for the heater 426. The use of the heater 426 can help vaporize the methanol while the air supply tube 404 is being heated from a lower temperature by the exhaust.

At operation 510, the temperature controller 173 determines if a temperature or time setpoint is reached. For example, the heater 426 can be programed to operate for a certain period of time. In another example, the heater 426 can be programmed to operate until a temperature recorded by the thermocouple 169 meets a setpoint. At operation 512, in response to a setpoint being reached, the heater 426 is turned off and the operation 506 is commenced, whereby the configuration of the internal combustion engine 102 is maintained. At operation 510, in response to the temperature controller 173 determining that a setpoint has not been reached, at operation 508, the heater 426 is maintained on.

The heater 426 can be used to provide heat during a phase of operation of the internal combustion engine 102 in which heat from the exhaust is insufficient to vaporize methanol to a desired degree. However, the heater 426 can be used in steady state and startup (or shutdown) conditions. The heater 426 can be used to provide supplementary heat during an idling condition of the internal combustion engine 102, whereby the exhaust is minimal and may not have enough heat to vaporize the methanol to a desired degree. However, other structural technologies may be used to increase the amount of heat added to methanol or the probability that methanol will be heated, explained in more detail in FIGS. 6 and 7, below.

Figure 6:
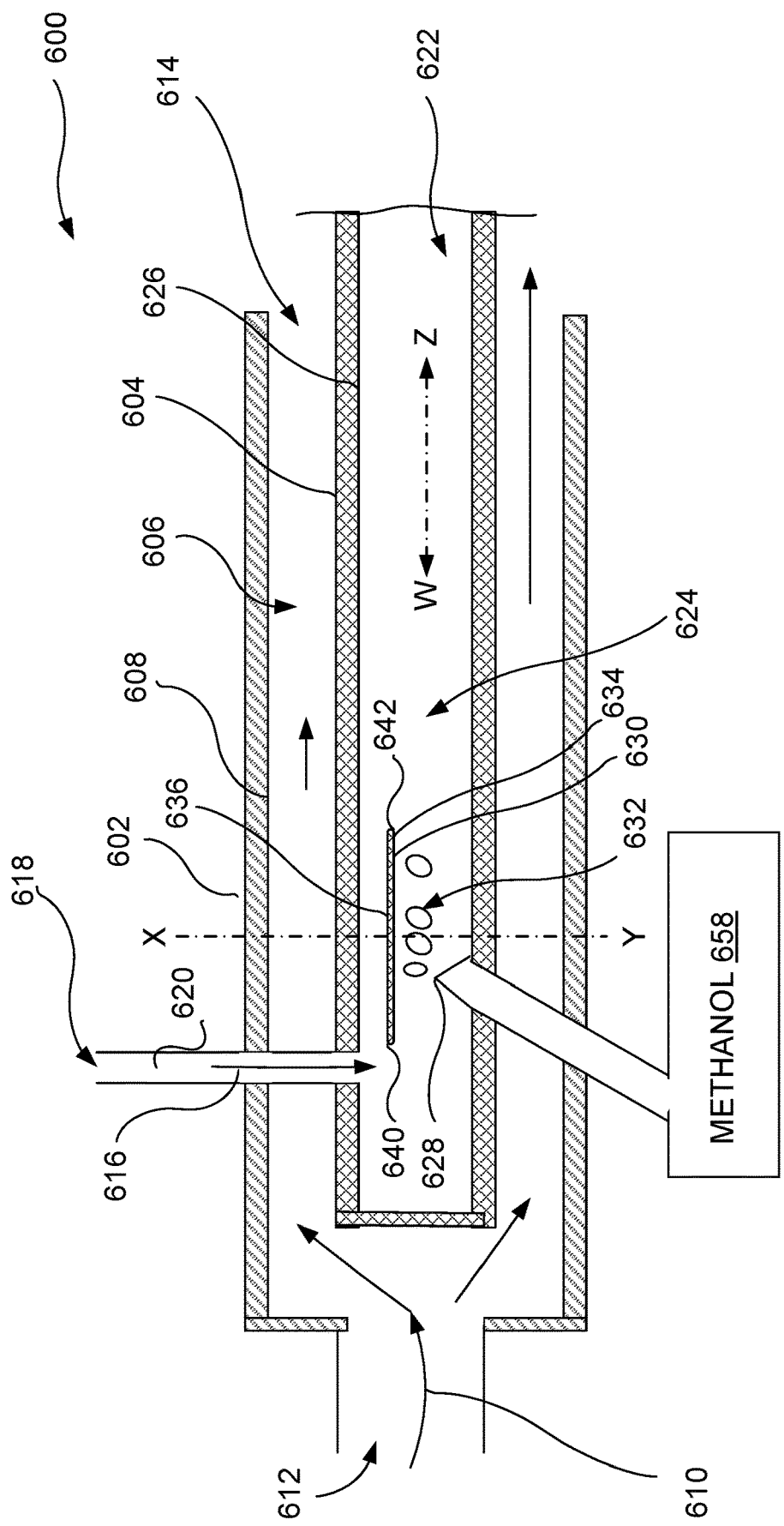
FIG. 6 is a cross-sectional view of an exhaust heater that uses structural components to increase heat addition to methanol, in accordance with one or more examples of the present disclosure.

FIG. 6 is a cross-sectional view of an exhaust heater 600 that uses structural components to increase heat addition to methanol, in accordance with one or more examples of the present disclosure. In FIG. 6, the exhaust heater 600 includes an exhaust tube 602 and an air supply tube 604. The air supply tube 604 is in an annular space 606 defined by an interior surface 608 of the exhaust tube 602, a "tube in tube" configuration" as explained in FIG. 2, above. Exhaust 610 from an internal combustion engine, such as the internal combustion engine 102 of FIG. 1, enters the exhaust tube 602 at exhaust input 612 and exits at exhaust output 614. Air 616 enters the air supply tube 604 from air input 618, through air input tube 620 and exits through air output 622. From air output 622, the air 616 continues to an engine. It should be noted that the air 616 and/or the exhaust 610 may be from compressed sources (such as a compressor and turbine, respectively) or from uncompressed sources. The presently disclosed subject matter is not limited to any particular source.

Heat from the exhaust 610 travels through the exhaust tube 602 and into an annular space 624 of the air supply tube 604, the annular space 624 defined by an internal surface 626 of the air supply tube 604. To increase the potential for introducing heat from the exhaust 610 to methanol 658 injected into the annular space 624 through injection port 628, the air supply tube 604 includes a fin 630. The fin 630 is a piece of metallic or semi-metallic piece affixed or attached to, or installed onto, the internal surface 626 and is positioned so that droplets 632 of the methanol 658 have a probability of impacting an injector facing surface 634 of the fin 630. The fin 630 is affixed to the internal surface 626 in a way that the fin 630 conducts heat from the internal surface 626, which is heated by the exhaust 610, to the injector facing surface 634 of the fin 630. Surfaces of the fin 630, such as the injector facing surface 634 and a fin surface 636 is heated by heated air 616 moving over the fin 630 and by heat transfer into the air supply tube 604 by the exhaust 610 moving over the air supply tube 604.

Using the fin 630 as a heated target location for the droplets 632 can increase the probability of some of the droplets 632 being vaporized. In some examples, heat conduction from a solid surface, such as the injector facing surface 634 of the fin 630 has a greater rate of heating than heat conducted between two fluids, such as the air 616 and the methanol 658, moving in a space. The reason for that is that for two fluids to exchange heat in an appreciable manner, molecules of the two fluids need to be in proximity to each other. In the context when one of the fluids is a gas (the air 616), the molecules are relatively far apart, reducing the probability of a molecule of air 616 being in proximity to the droplets 632. In a different manner, the fin 630 is a solid surface position at a location in which the droplets 632 are likely to strike. Thus, not only does the density of molecules (solid versus gas) of the fin 630 increase the probability of heat transfer, the position of the fin 630 in relation to the droplets 632 also increases the probability of heat transfer. The placement, size, location, and number of fins 630 can be different in different configurations. For example, in FIG. 6, a single fin 630 is illustrated, though more fins may be used. Further, the fin 630 has a "wing shape" to reduce aerodynamic resistance of the fin 630 to the flow of the air 616. The fin 630 includes a leading edge 640 and a trailing edge 642 that can be shaped to reduce the aerodynamic resistance of the fin 630. Further, the fin 630 is placed and sized in a manner that also increases heat transfer, while potentially reducing drag, illustrated in more detail in FIG. 7, below.

Figure 7:
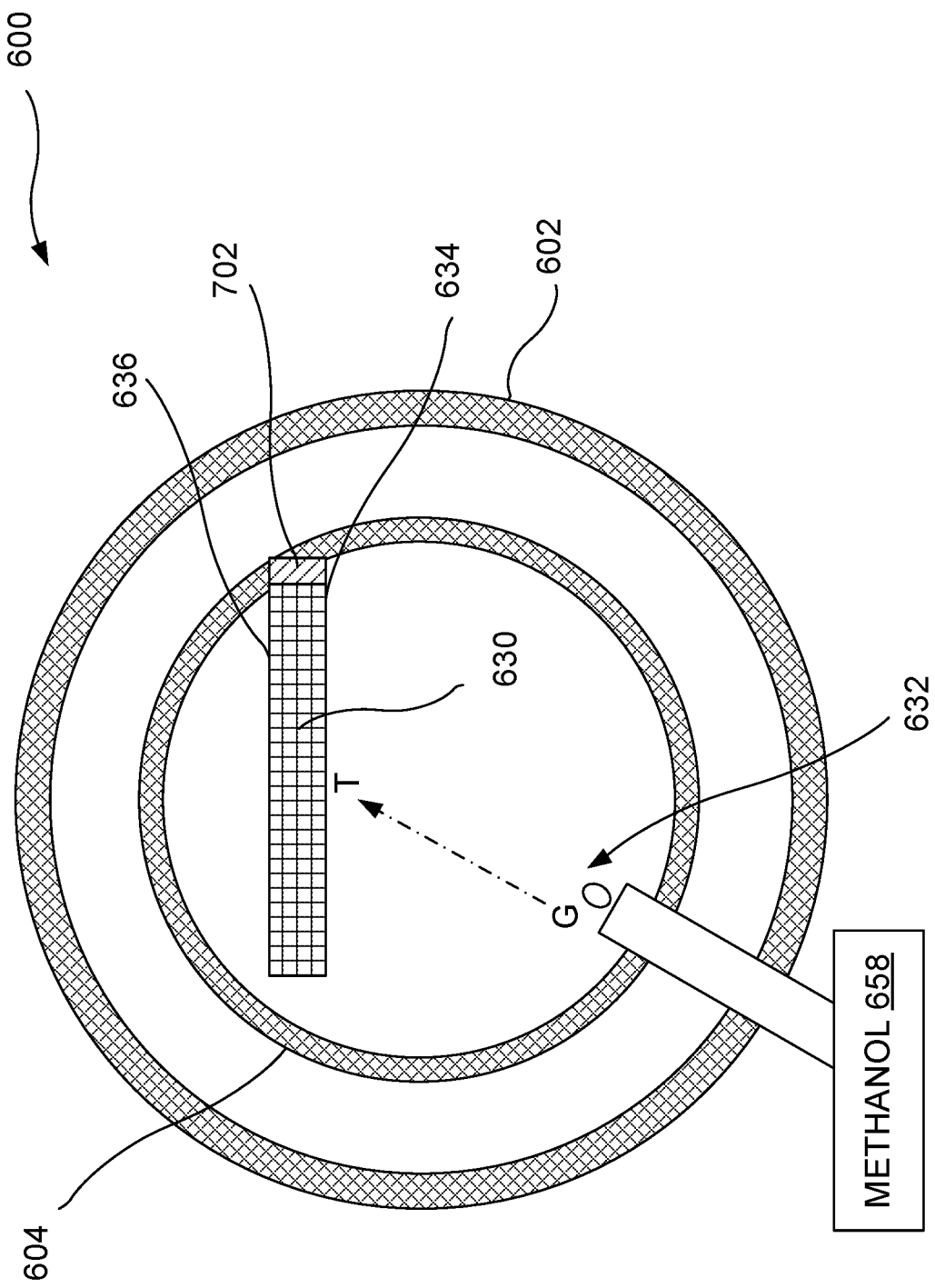
FIG. 7 is a cross-sectional view of an exhaust heater taken along a cut plane and viewed from a central axis, in accordance with one or more examples of the present disclosure.

FIG. 7 is a cross-sectional view of the exhaust heater 600 taken along cut plane XY and viewed from central axis WZ from location Z to location W, as illustrated in FIG. 6, in accordance with one or more examples of the present disclosure. Shown in FIG. 7 are the exhaust tube 602 and the air supply tube 604. Further illustrated are the fin 630, the fin surface 636 and the injector facing surface 634 of the fin 630. As discussed in FIG. 6, the fin 630 is placed in a directional path GT of the methanol droplets 632 so that the droplets 632 are directed to the injector facing surface 634 of the fin 630. Also illustrated is connecting interface 702, which connects the fin 630 to the internal surface 626 of the air supply tube 604. The connecting interface 702 can be a weld or some other form of attachment technology used to affix the fin 630 to the internal surface 626 of the air supply tube 604. In some examples, the connecting interface 702 is a heat transfer interface that provides for the conduction of heat from the internal surface 626 or the air supply tube 604 to the fin 630.

As mentioned previously, the presently disclosed subject matter is not limited to any particular type of engine configuration. Various examples of the presently disclosed subject matter can be used in various types of engines with various types of technological implementations. For example, the presently disclosed subject matter can be used with engines having intercoolers (FIG. 8) and exhaust gas recirculation (EGR) technology (FIG. 9).

Figure 8:
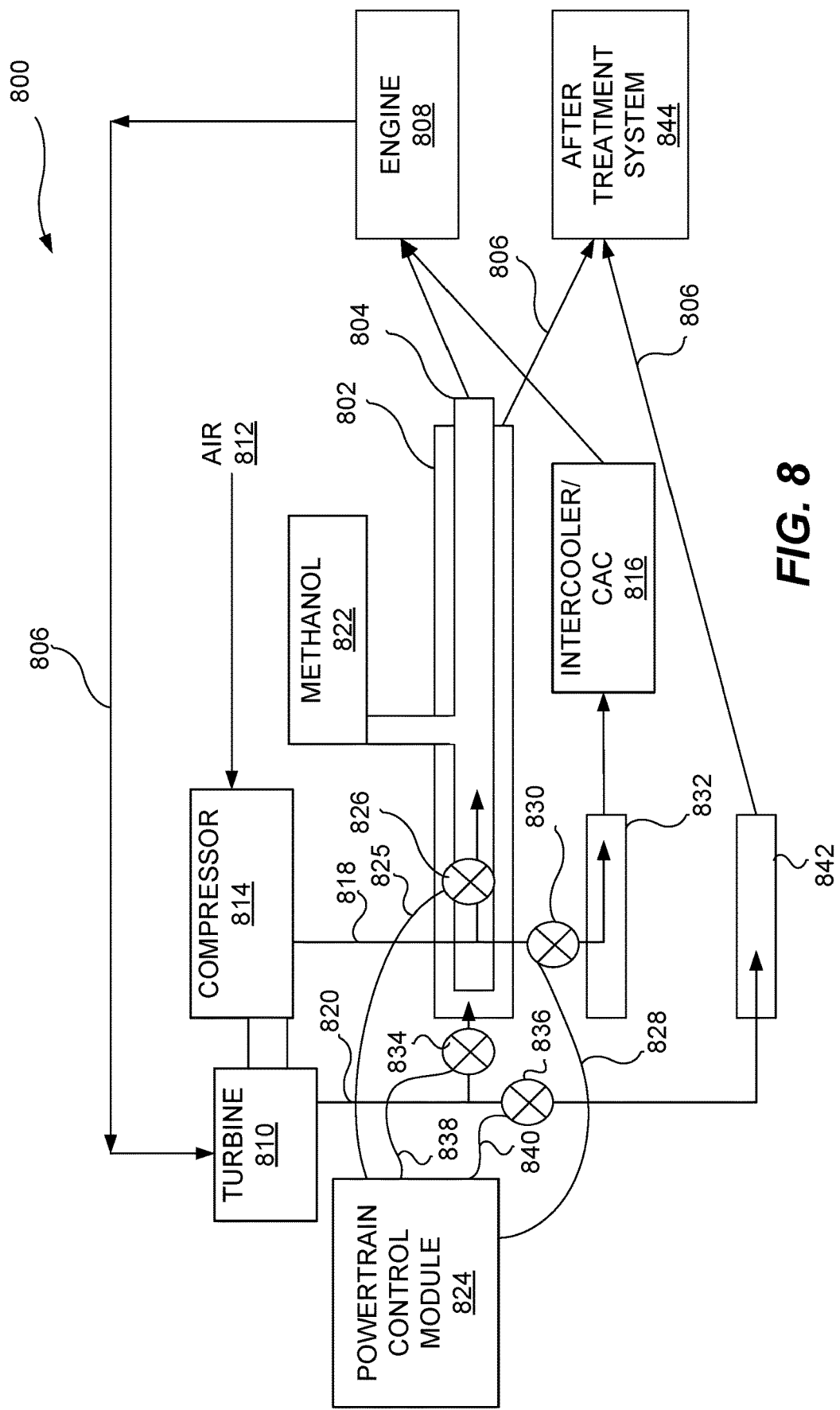
FIG. 8 is a fluid flow diagram illustrating a system for heating methanol in a system that uses an intercooler, in accordance with one or more examples of the present disclosure.
Figure 9:
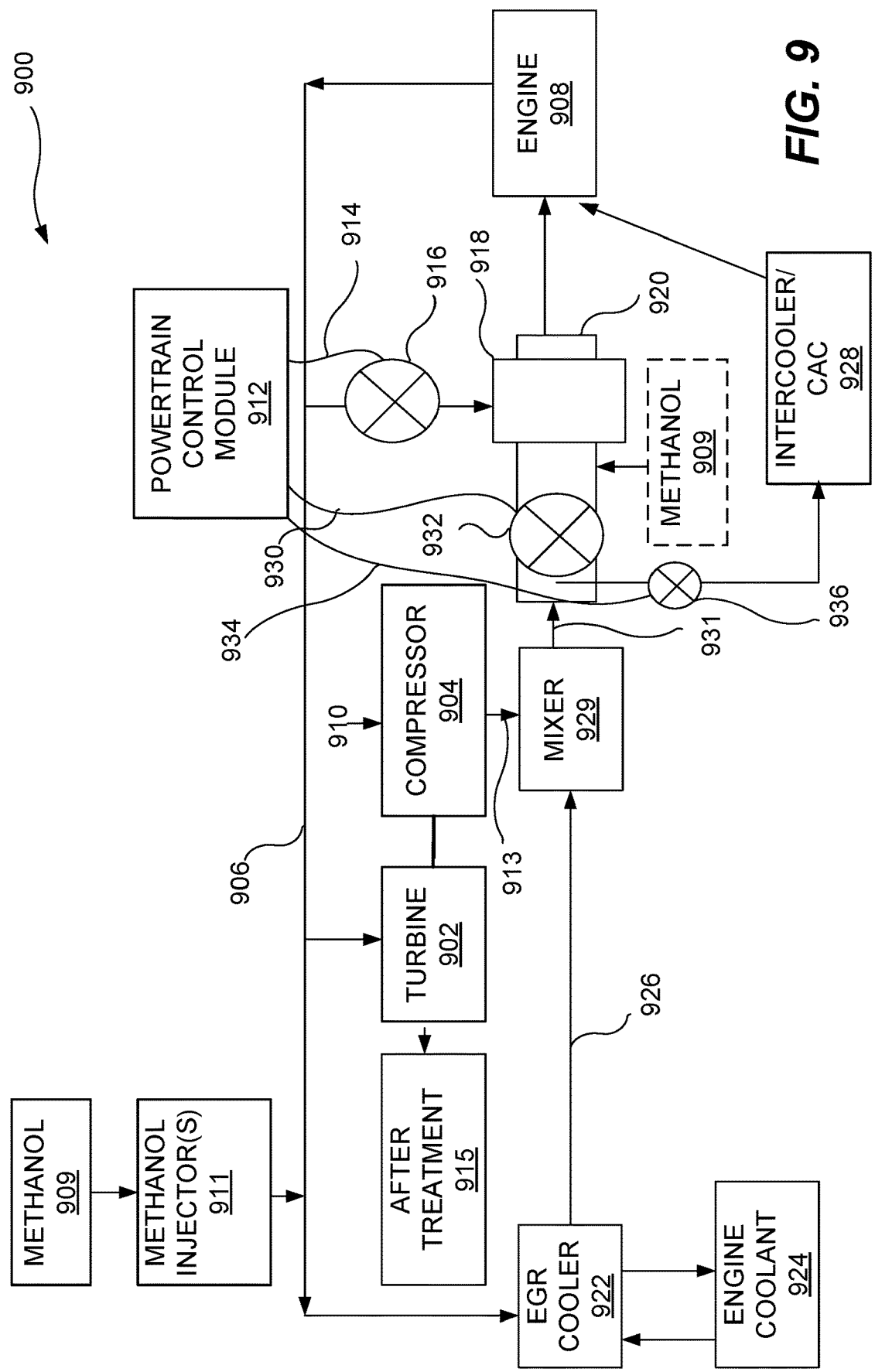
FIG. 9 is a fluid flow diagram illustrating a system for heating methanol in a system that uses exhaust gas recirculation to moderate nitrogen oxide production, in accordance with one or more examples of the present disclosure.

FIG. 8 is a fluid flow diagram illustrating a system 800 for heating methanol in a system that uses an intercooler, in accordance with one or more examples of the present disclosure. The system of FIG. 8 includes an exhaust tube 802 and an air supply tube 804. Exhaust 806 from an engine 808 enters a turbine 810. The exhaust 806, at a relatively higher pressure and temperature than air 812 causes the turbine 810 to rotate the blades of a compressor 814. The rotational motion of blades of the compressor 814 causes the air to be compressed upon entry into the air supply tube 804 to provide a source of compressed air to the engine 808 for combustion (fuel injectors not shown). In the system 800 of FIG. 8, an intercooler/charged-air-cooled (CAC) 816 is used. The intercooler/CAC cools compressed air before it enters a combustion chamber (not shown) of the engine 808. A purpose is to lower the temperature of the air 812 entering the engine 808 to, in some examples, improve emissions and output power efficiency. Excessive temperatures can lead to reduced charge density and higher combustion temperatures which can affect torque, power, and emissions. Thus, in the system 800 of FIG. 8, the intercooler/CAC 816 is used as a control mechanism to moderate and control the heat of the air 812 entering the engine 808.

Compressed air 818 exiting the compressor 814 can travel into the air supply tube 804 and/or into an intercooler tube 832. In a first example, the compressed air 818 enters the air supply tube 804, where turbine exhaust 820 enters the exhaust tube 802 and adds heat to the compressed air 818 moving through the air supply tube 804 in a manner described above in FIGS. 1-6. Methanol 822 is injected into the air supply tube 804, whereby the heat added by the turbine exhaust 820 increases the heat of the methanol 822, thereby vaporizing at least a portion of the methanol 822. If it is desired to moderate a temperature of the compressed air 818 entering the engine 808, a powertrain control module 824 sends a signal 825 to close, at least partially, compressed air valve 826 and a signal 828 to open, at least partially, intercooler valve 830. When the intercooler valve 830 is at least partially opened, a portion of the compressed air 818 enters the intercooler tube 832 and into the intercooler/CAC 816. Thus, the powertrain control module 824 opens and closes, or throttles if not fully opened or closed, the compressed air valve 826 and the intercooler valve 830 to maintain a desired temperature of the compressed air 818 into the engine 808.

In a similar manner, the powertrain control module 824 uses two exhaust valves, exhaust heater valve 834 and exhaust bypass valve 836, to control the amount of heating applied to the compressed air 818. To reduce the amount of heating by the turbine exhaust 820, the powertrain control module 824 sends a signal 838 to at least partially close the exhaust heater valve 834 and a signal 840 to at least partially open the exhaust bypass valve 836, thereby reducing the amount of the turbine exhaust 820 that heats the air supply tube 804. To increase the amount of heating by the turbine exhaust 820, the powertrain control module 824 sends the signal 838 to at least partially open the exhaust heater valve 834 and the signal 840 to at least partially closer the exhaust bypass valve 836, thereby increasing the amount of the turbine exhaust 820 that heats the air supply tube 804. The turbine exhaust 820 that flows through the exhaust bypass valve 836 enters intercooler/CAC bypass tube 842 and, like the turbine exhaust 820 that flows through the exhaust tube 802, enters an aftertreatment system 844. The aftertreatment system 844 can be a release into ambient air 812 or emission-reduction technologies like a catalytic converter.

Often components of exhaust, like nitrogen oxides (NOx) can be a significant source of pollution and greenhouse gases. Nitrogen oxides are normally formed in the process of combustion in the engine cylinders. However, their formation increases dramatically at higher combustion temperatures (above 1600° C. or 2912° F.). A technology designed to ameliorate the production of NOx is exhaust gas recirculation (EGR). The EGR system reduces the combustion temperature by diverting a small portion of the exhaust gases back into the intake manifold. Because exhaust gases are primarily no longer combustible, EGR systems introduce exhaust gas into the air intake to dilute the intake air with exhaust gases. Because exhaust gases are no longer combustible, the diluted air/fuel mixture is less combustible. FIG. 9 is an example of the use of an EGR system.

FIG. 9 is a fluid flow diagram illustrating a system 900 for heating methanol in a system that uses exhaust gas recirculation to moderate NOx production, in accordance with one or more examples of the present disclosure. The system 900 includes a turbine 902 and a compressor 904. The turbine 902 receives exhaust 906 from an engine 908. The pressure of the exhaust 906 turns the turbine 902, which in turn turns the compressor 904 to compress air 910 into compressed air 913. The exhaust 906 leaving the turbine 902 exhausts into an aftertreatment system 915 to allow the exhaust 906 to enter the air 910. To heat methanol 909 to at least partially vaporize a portion of the methanol 909, the methanol 909 is injected into the exhaust 906 through methanol injector(s) 911. It should be noted that the process of injecting the methanol 909 into the exhaust 906 to at least partially vaporize the methanol 909 can also be used in conjunction with the methanol heating technologies described in FIGS. 1-8, above, whereby the methanol is injected into a compressed air stream that is heated by the exhaust. For example, a powertrain control module 912 sends a signal 914 to at least partially open exhaust heater valve 916 to allow a portion of the exhaust 906 to enter an exhaust heater 918 that heats the compressed air 913. The methanol 909 can be injected into an air supply tube 920 in a manner similar to FIGS. 1-8, above.

The system 900 includes an exhaust gas recirculation (EGR) cooler 922. The EGR cooler 922 is a heat exchanger that cools the exhaust 906 by using engine coolant 924. Cooled exhaust 926 enters a mixer 929 that mixes the cooled exhaust 926 with the compressed air 913. The mixture of the cooled exhaust 926 and the compressed air 913 can travel two paths, the paths of which may not be entirely exclusive (meaning not one or the other, but both at the same time). The first path is that the mixture of the cooled exhaust 926 and the compressed air 913 enters the air supply tube 920 and then the engine 908. The second path is that the mixture of the cooled exhaust 926 and the compressed air 913 enters an intercooler/charged-air-cooled (CAC) 928 is used. The intercooler/CAC 928 cools compressed air 913 before it enters a combustion chamber (not shown) of the engine 908. To allow for at least a portion of the mixture of the cooled exhaust 926 and the compressed air 913 to enter the air supply tube 920, the powertrain control module 912 sends signal 930 to at least partially open an air supply valve 932. To allow for at least a portion of the mixture 931 of the cooled exhaust 926 and the compressed air 913 to enter the intercooler/CAC 928, the powertrain control module 912 sends signal 934 to at least partially open intercooler valve 936.

Figure 10:
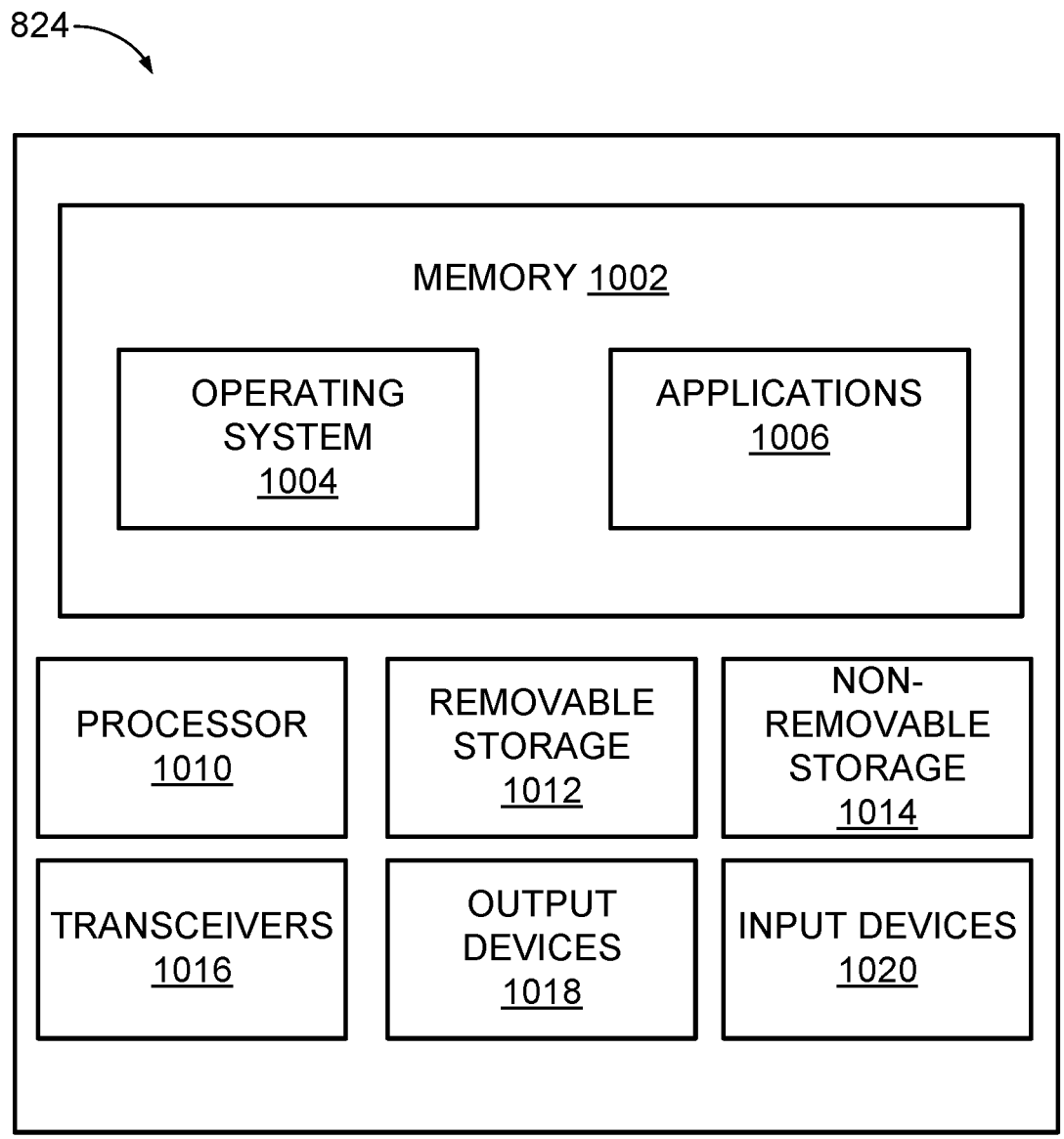
FIG. 10 depicts a component level view of the powertrain control module for use with the systems and methods described herein.

FIG. 10 depicts a component level view of the powertrain control module 824 for use with the systems and methods described herein. The powertrain control module 824 can comprise several components to execute the above-mentioned functions, including the powertrain control module 912 of FIG. 9. As discussed below, the powertrain control module 824 can comprise memory 1002 including an operating system (OS) 1004 and one or more standard applications 1006. The standard applications 1006 can include many features common to engines such as ignition timing, engine control management, and the like. The standard applications 1006 can also include valve signal generators to control various valves, including the compressed air valve 826 and the intercooler valve 830, among others.

The powertrain control module 824 can also comprise one or more processors 1010 having one or more cores and one or more of removable storage 1012, non-removable storage 1014, transceiver(s) 1016, output device(s) 1018, and input device(s) 1020. In various implementations, the memory 1002 can be volatile (such as random access memory (RAM)), non-volatile (such as read only memory (ROM), flash memory, etc.), or some combination of the two. The OS 1004 contains the modules and software that support basic functions of the powertrain control module 824, including the generation of signals to open and close valves.

In some implementations, the processor(s) 1010 can be one or more central processing units (CPUs), graphics processing units (GPUs), both CPU and GPU, or any other processing unit. The powertrain control module 824 may also include additional data storage devices (removable and/or non-removable) such as, for example, magnetic disks, optical disks, or tape. Such additional storage is illustrated in FIG. 10 by removable storage 1012 and non-removable storage 1014.

Non-transitory computer-readable media may include volatile and nonvolatile, removable and non-removable tangible, physical media implemented in technology for storage of information, such as computer readable instructions, data structures, program modules, or other data. The memory 1002, removable storage 1012, and non-removable storage 1014 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the powertrain control module 824. Any such non-transitory computer-readable media may be part of the powertrain control module 824 or may be a separate database, databank, remote server, or cloud-based server. In some implementations, the transceiver(s) 1016 include any transceivers known in the art. In some examples, the transceiver(s) 1016 are used to transmit signals to open or close valves in various examples disclosed herein.

The transceiver(s) 1016 may also include one or more radio transceivers that perform the function of transmitting and receiving radio frequency communications via an antenna (e.g., Wi-Fi or Bluetooth®).

In some implementations, the output device(s) 1018 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. In various implementations, input device(s) 1020 include any input devices known in the art. For example, the input device(s) 1020 may include a camera, a microphone, or a keyboard/keypad.

INDUSTRIAL APPLICABILITY

The present disclosure describes systems and processes for the heating of methanol 158, and to at least partially vaporize the methanol 158 prior to entering a combustion cylinder 110A or 110B of an internal combustion engine 102. Methanol can be used in a variety of types of combustion engines, and the availability of methanol can be greater than other sources of alternate fuel additives because methanol can be produced in a variety of ways using a variety of stock material ranging from natural gas to coal. Vaporizing the methanol reduces the thermal load on the engine (i.e. the amount of heat needed to vaporize the methanol in order to combust the methanol). Methanol is injected into an air supply tube 404 with compressed air. Exhaust intake 148 is ported around the air supply tube 404, heating the walls of the air supply tube 404, which in turn heats and vaporizes at least a portion of the liquid methanol.

Vaporizing methanol has several benefits. In some examples, because of its relatively high heat of vaporization, liquid methanol can remove heat from internal components of an engine. This can change the thermal characteristics of the engine, potentially causing reduced performance because methanol, like other hydrocarbons, need to be in vapor form to combust. If entering a combustion chamber in liquid form, the liquid methanol will remove thermal energy from a combustion process in order to vaporize, thus reducing the pressure in the combustion chamber, and in turn, reducing engine performance. Additionally, liquid methanol can cause random perturbations (or deviations) in the conditions of a combustion cylinder, increasing cycle-to-cycle variations and decreasing combustion stability. Reducing the amount of methanol entering into a combustion chamber in a liquid phase can improve combustion stability and reduce cycle-to-cycle variations. Further, liquid methanol can be corrosive, reducing the life-expectancy of an engine or causing mechanical issues.

In some examples, different types of flow patterns can be used to increase thermal energy transfer between the relatively warmer exhaust gases and the methanol. In some examples, a counterflow, whereby the exhaust and the air entrained with the liquid methanol travel in opposite directions, can be beneficial. The reason for this is that a greater temperature difference creates a greater thermal driving force. In a concurrent flow, the temperature of the fluids (the air 318 and the exhaust 312) come closer, reducing the thermal driving force, thus, reducing the rate of heat exchange. In the countercurrent flow design of FIG. 3, there is a relatively greater temperature difference between the fluids (the air 318 and the exhaust 312) as compared to a concurrent flow design, thus increasing the rate of heat exchange and extracting a higher proportion of heat content from the exhaust 312 to the air 318

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of operating an engine, comprising:
receiving air into a heating section of an intake manifold;
injecting methanol into the heating section to form a methanol/air mixture;
vaporizing at least a portion of the methanol in the methanol/air mixture by directing exhaust into an exhaust heater, wherein the heating section is at least partially internally disposed within the exhaust heater allowing for heat from the exhaust to heat the heating section;
introducing a fuel and the methanol/air mixture into a combustion cylinder; and
causing the fuel and the methanol/air mixture in the combustion cylinder to ignite.

2. The method of claim 1, wherein a compression in the combustion cylinder causes the fuel to autoignite, and wherein autoignition of the fuel ignites the methanol/air mixture.

3. The method of claim 1, wherein injecting the methanol into the heating section comprising directing the methanol to an internal surface of the heating section.

4. The method of claim 1, further comprising directing a portion of the air into an intercooler.

5. The method of claim 1, wherein a flow of the methanol/air mixture is concurrent flow wherein the methanol/air mixture flows in same direction as the exhaust in the exhaust heater.

6. The method of claim 1, wherein a flow of the methanol/air mixture is counterflow wherein the methanol/air mixture flows in an opposite direction to the exhaust in the exhaust heater.

7. The method of claim 1, further comprising activating a heater disposed on a surface of the heating section to heat at least a portion of the heating section.

8. The method of claim 1, further comprising:
compressing the air, using a compressor, prior to the air being received into the heating section of the intake manifold; and
powering the compressor by directing the exhaust into a turbine connected to the compressor prior to directing the exhaust into the exhaust heater.

9. The method of claim 8, further comprising:
detecting a temperature of the exhaust after the turbine
determining that the temperature is greater than a setpoint; and
based at least in part on determining that the temperature is greater than the setpoint, causing a throttle valve to open, wherein the throttle valve directs at least a portion of the exhaust into an exhaust port, reducing an amount of exhaust directed to the exhaust heater.

10. The method of claim 1, wherein injecting the methanol into the heating section comprising directing the methanol to an injector facing surface of a fin installed on an internal surface of the heating section.

11. The method of claim 10, wherein a portion of the surface of the fin is heated by the air moving over the portion of the surface of the fin.

12. The method of claim 10, wherein a portion of the surface of the fin is heated by heat transfer from the internal surface of the heating section into the fin.

13. An exhaust heater system, comprising:
- an exhaust tube having an exhaust tube outer surface, an exhaust tube inner surface, and a longitudinal central axis extending substantially centrally through the exhaust tube, the exhaust tube inner surface defining an interior space of the exhaust tube;
- an air supply tube disposed within the interior space of the exhaust tube, the air supply tube having an air supply tube outer surface and an air supply tube inner surface;
- a methanol injector configured to inject methanol into the air supply tube;
- a turbine configured to receive exhaust from an engine and direct the exhaust to the exhaust tube; and
- a compressor powered by the turbine, the compressor configured to direct compressed air into the air supply tube, wherein heat from the exhaust in the exhaust tube heats and vaporizes at least a portion of the methanol injected into the air supply tube.

14. The exhaust heater system of claim 13, wherein the air supply tube comprises insulation installed on at least a portion of air supply tube outer surface, wherein at least a portion of the air supply tube is double walled construction.

15. The exhaust heater system of claim 13, further comprising:
- a compressed air valve;
- an intercooler valve;
- an intercooler to cool the compressed air; and
- a powertrain control module that controls an opening or closing of the compressed air valve and the intercooler valve, wherein opening the compressed air valve increases an amount of compressed air entering the air supply tube, and wherein opening the intercooler valve increases an amount of the compressed air entering the intercooler.

16. The exhaust heater system of claim 13, further comprising:
- an exhaust gas recirculation cooler that receives a portion of the exhaust and cools the exhaust to cooled exhaust; and
- a mixer to mix the cooled exhaust with the compressed air.

17. The exhaust heater system of claim 13, further comprising a fin attached to an internal surface of the air supply tube and disposed within an interior heat exchange cavity of the air supply tube, the fin installed at a location to cause at least a portion of the methanol to impinge an injector facing surface of the fin.

18. The exhaust heater system of claim 17, wherein a portion of the surface of the fin is heated by the air moving over the surface of the fin or heat transfer from the internal surface of the air supply tube into the fin.

19. An internal combustion engine fuel system, comprising:
- an exhaust heater system comprising:
  - an exhaust tube having an exhaust tube outer surface, an exhaust tube inner surface, and a longitudinal central axis extending substantially centrally through the exhaust tube, the exhaust tube inner surface defining an interior space of the exhaust tube;
  - an air supply tube disposed within the interior space of the exhaust tube, the air supply tube having an air supply tube outer surface and an air supply tube inner surface;
  - a methanol injector configured to inject methanol into the air supply tube;
  - a turbine configured to receive exhaust from an engine and direct the exhaust to the exhaust tube; and
  - a compressor powered by turbine, the compressor configured to direct compressed air into the air supply tube to form a methanol/air mixture in the air supply tube; wherein heat from the exhaust in the exhaust tube heats and vaporizes at least a portion of the methanol injected into the air supply tube; and
- a fuel injector for injecting a fuel into the methanol/air mixture.

20. The internal combustion engine fuel system of claim 19, further comprising;
- an exhaust gas recirculation cooler that receives a portion of the exhaust and cools the exhaust to cooled exhaust; and
- a mixer to mix the cooled exhaust with the compressed air.

* * * * *